United States Patent
Marlow et al.

(10) Patent No.: US 9,352,766 B2
(45) Date of Patent: May 31, 2016

(54) SYSTEM FOR GLIDING ON SNOW WITH IMPROVED MOBILITY

(71) Applicant: Marlow Dynamics, LLC, West Saint Paul, MN (US)

(72) Inventors: Thomas George Marlow, Cape Elizabeth, ME (US); John Titus Marlow, West Saint Paul, MN (US)

(73) Assignee: Marlow Dynamics, West Saint Paul, MN (US)

( * ) Notice: Subject to any disclaimer, the term of this patent is extended or adjusted under 35 U.S.C. 154(b) by 133 days.

(21) Appl. No.: 13/944,871

(22) Filed: Jul. 17, 2013

(65) Prior Publication Data

US 2014/0021689 A1    Jan. 23, 2014

Related U.S. Application Data

(60) Provisional application No. 61/672,310, filed on Jul. 17, 2012.

(51) Int. Cl.
    *B62B 15/00* (2006.01)

(52) U.S. Cl.
    CPC ........................ *B62B 15/00* (2013.01)

(58) Field of Classification Search
    CPC ........ A63C 5/03; A63C 5/0411; A63C 5/052; A63C 2203/40
    See application file for complete search history.

(56) References Cited

U.S. PATENT DOCUMENTS

| | | | | |
|---|---|---|---|---|
| 4,221,394 A * | 9/1980 | Campbell | ............ | A63C 10/005 280/14.25 |
| D308,711 S | 6/1990 | Katz | | |
| 5,613,695 A * | 3/1997 | Yu | ............ | A63C 5/031 280/14.24 |
| 5,618,051 A * | 4/1997 | Kobylenski | ............ | A63C 5/02 280/14.21 |
| D383,824 S | 9/1997 | Mendoza et al. | | |
| D391,613 S | 3/1998 | Shannon | | |
| 5,799,956 A * | 9/1998 | Shannon | ............ | A63C 5/031 280/14.21 |
| 5,865,446 A * | 2/1999 | Kobylenski | ............ | A63C 5/02 280/14.23 |
| 5,988,668 A | 11/1999 | DeVille et al. | | |
| 6,244,615 B1 * | 6/2001 | Mendoza | ............ | A63C 5/00 280/14.21 |
| 6,270,091 B1 * | 8/2001 | Smith | ............ | A63C 5/031 280/14.21 |
| 6,290,249 B1 * | 9/2001 | Wolf | ............ | A63C 5/03 280/14.21 |
| 6,481,741 B1 | 11/2002 | Porte | | |
| 6,648,347 B1 * | 11/2003 | Rieg | ............ | A63C 5/02 280/14.25 |
| 6,834,867 B2 * | 12/2004 | Smith | ............ | A63C 5/031 280/14.21 |

(Continued)

*Primary Examiner* — Brodie Follman

(57) ABSTRACT

Systems, apparatus and methods for gliding on a surface with improved mobility are described. According to various embodiments, boards are provided which are configured to overlap. This innovative overlapping ability helps allow for versatile stance configuration and ensures that collision between the boards occurs between a base and an edge. This type of collision will generally result in a sliding action, allowing one board to ride up onto the top of the edge of the other board. This type of interaction reduces damage to the boards and improves riding experience. Boards with equal height nose and tail shovels are more likely to collide edge-to-edge in a disruptive manner. Other embodiments are described and claimed.

10 Claims, 11 Drawing Sheets

(56) References Cited

U.S. PATENT DOCUMENTS

| | | | | |
|---|---|---|---|---|
| 6,986,525 B2* | 1/2006 | Liard | A63C 5/052 | 280/601 |
| 7,083,178 B2 | 8/2006 | Potter | | |
| 7,159,875 B2* | 1/2007 | Seymour | A63C 5/02 | 280/11.18 |
| 7,422,228 B2* | 9/2008 | Cheung | A63C 5/03 | 280/14.22 |
| 7,510,206 B2* | 3/2009 | Walker | A63C 5/02 | 280/600 |
| 7,896,365 B2* | 3/2011 | Smith | A63C 5/03 | 280/14.21 |
| 8,517,410 B2* | 8/2013 | Pedersen | A63C 5/03 | 280/601 |
| 8,579,301 B2* | 11/2013 | Smith | A63C 5/03 | 280/14.21 |
| 8,939,463 B2* | 1/2015 | Mendoza | A63C 5/02 | 280/600 |
| 2003/0151229 A1* | 8/2003 | Muff, Jr. | A63C 5/03 | 280/608 |
| 2005/0110230 A1* | 5/2005 | Seymour | A63C 5/02 | 280/14.21 |
| 2006/0097484 A1* | 5/2006 | Walker | A63C 5/02 | 280/600 |
| 2010/0090425 A1* | 4/2010 | Karpman | A63C 5/031 | 280/14.22 |
| 2011/0079986 A1* | 4/2011 | Gradman | A63C 5/02 | 280/609 |
| 2013/0015638 A1 | 1/2013 | Mendoza | | |
| 2013/0270782 A1* | 10/2013 | Gyr | B62B 13/005 | 280/17 |
| 2014/0021689 A1* | 1/2014 | Marlow | B62B 15/00 | 280/18 |

* cited by examiner

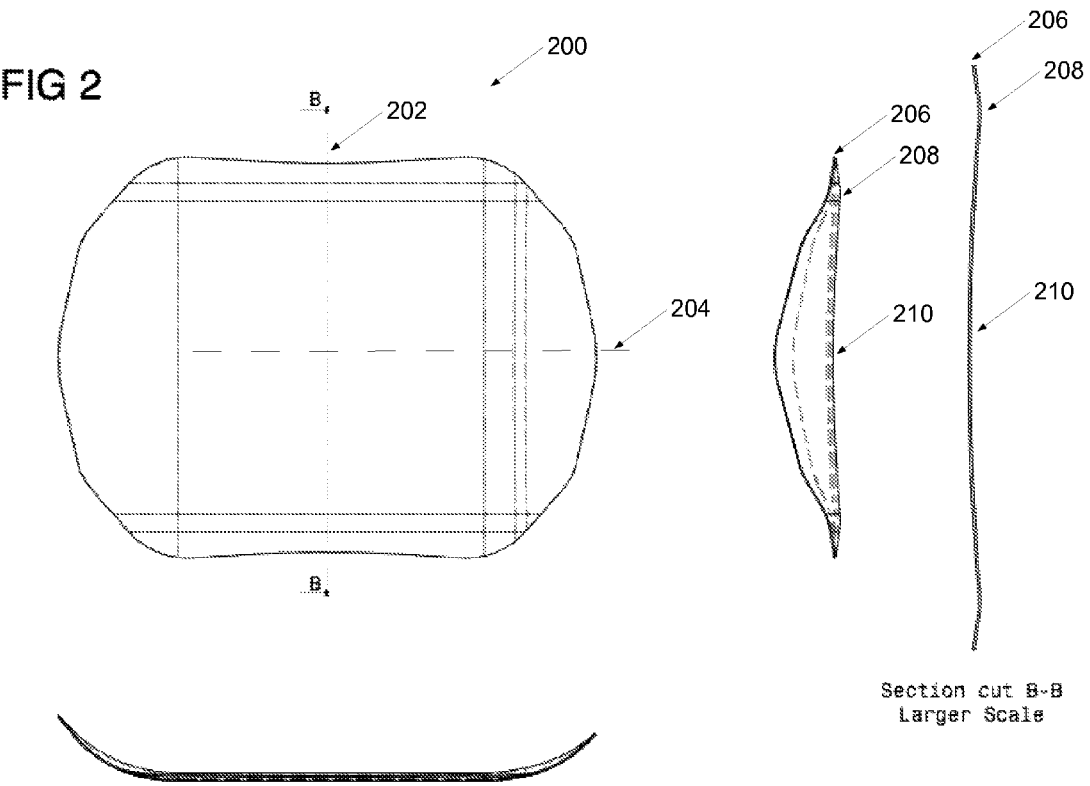

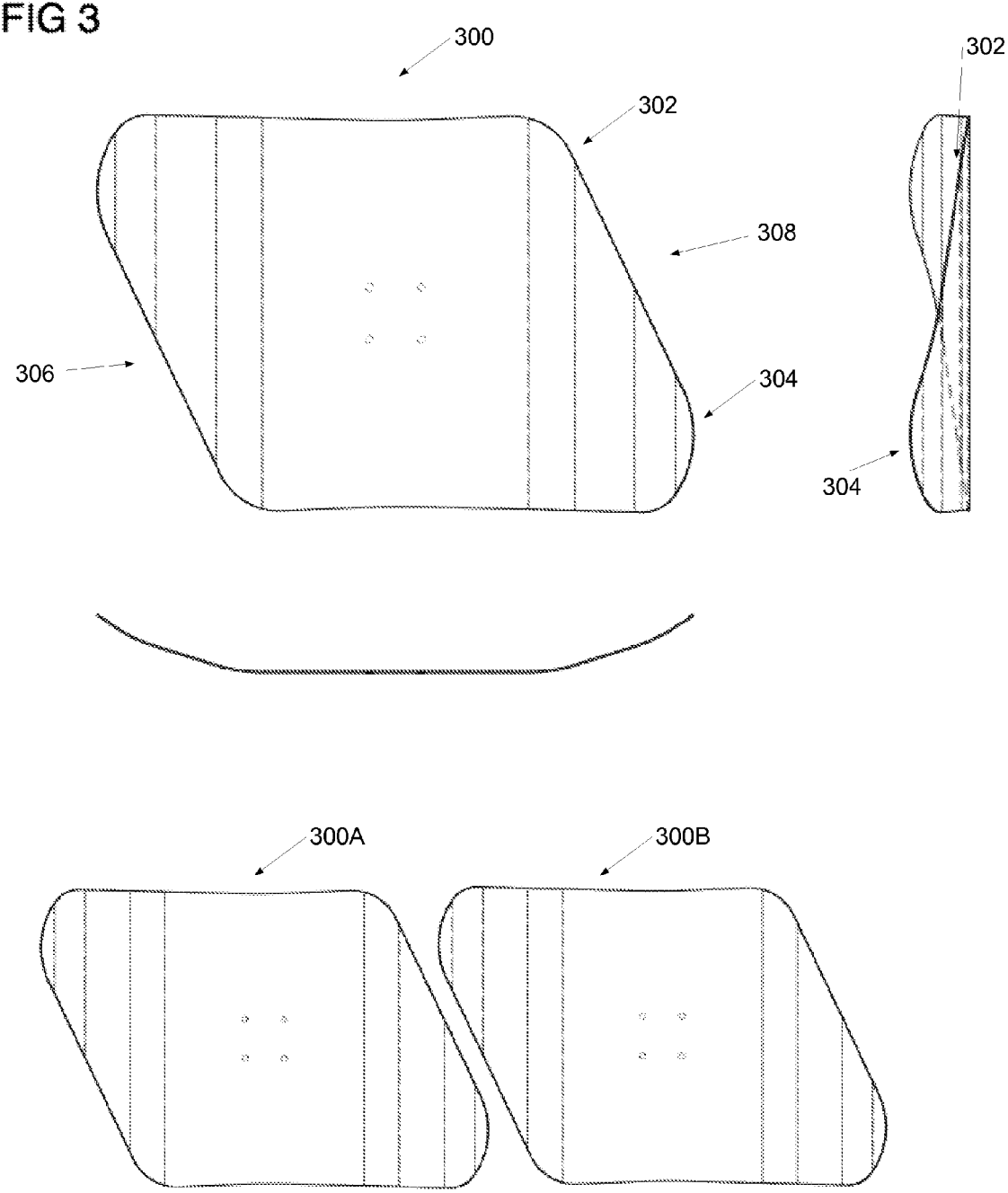

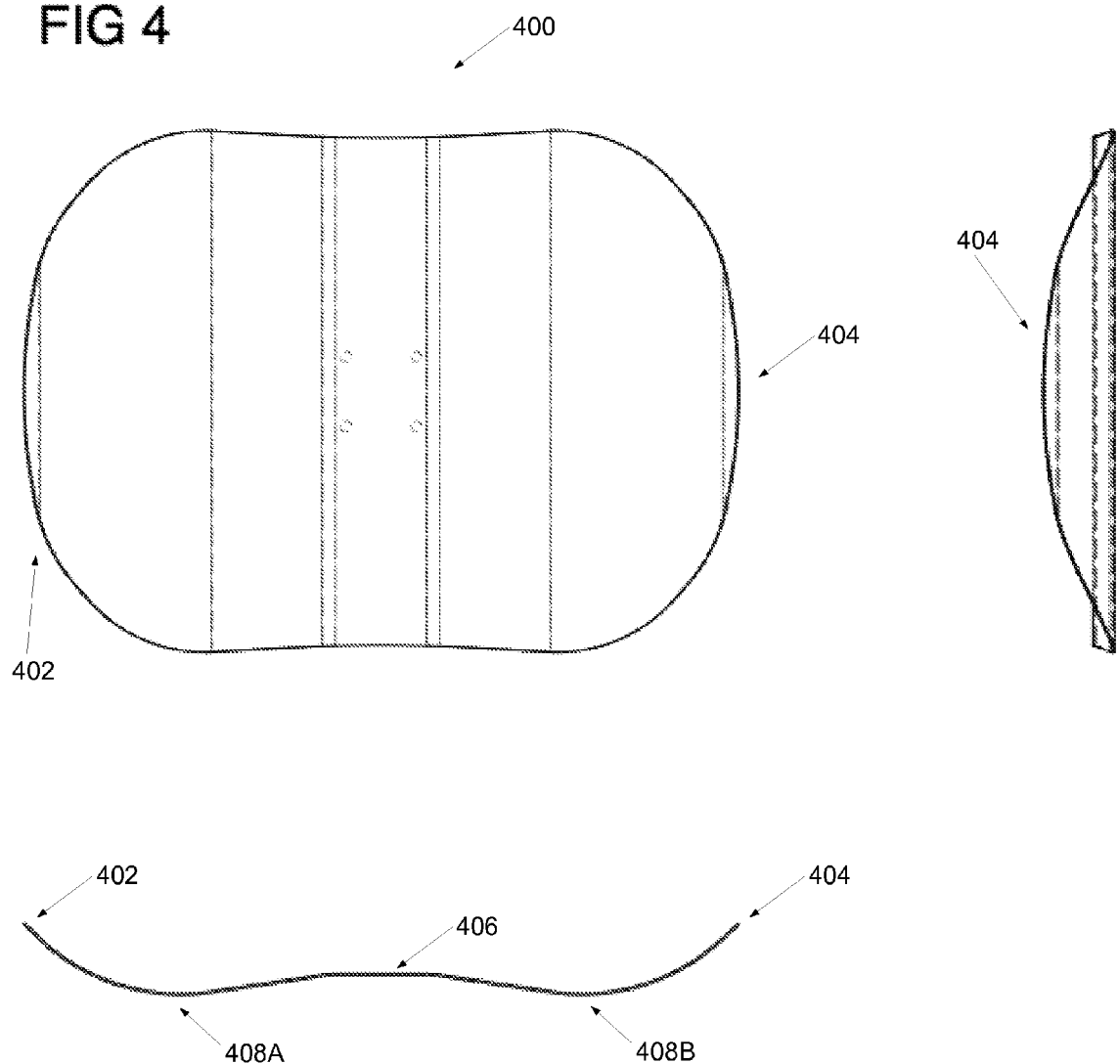

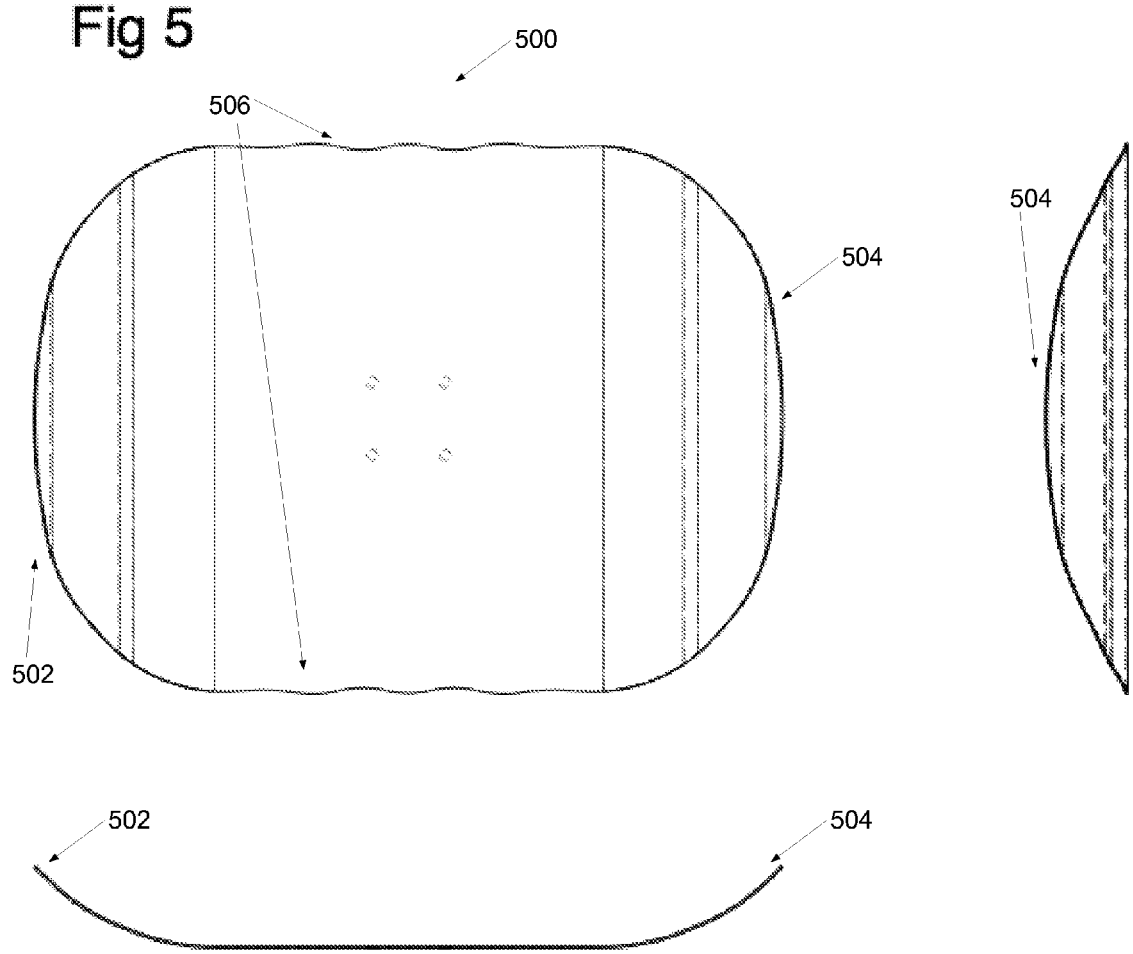

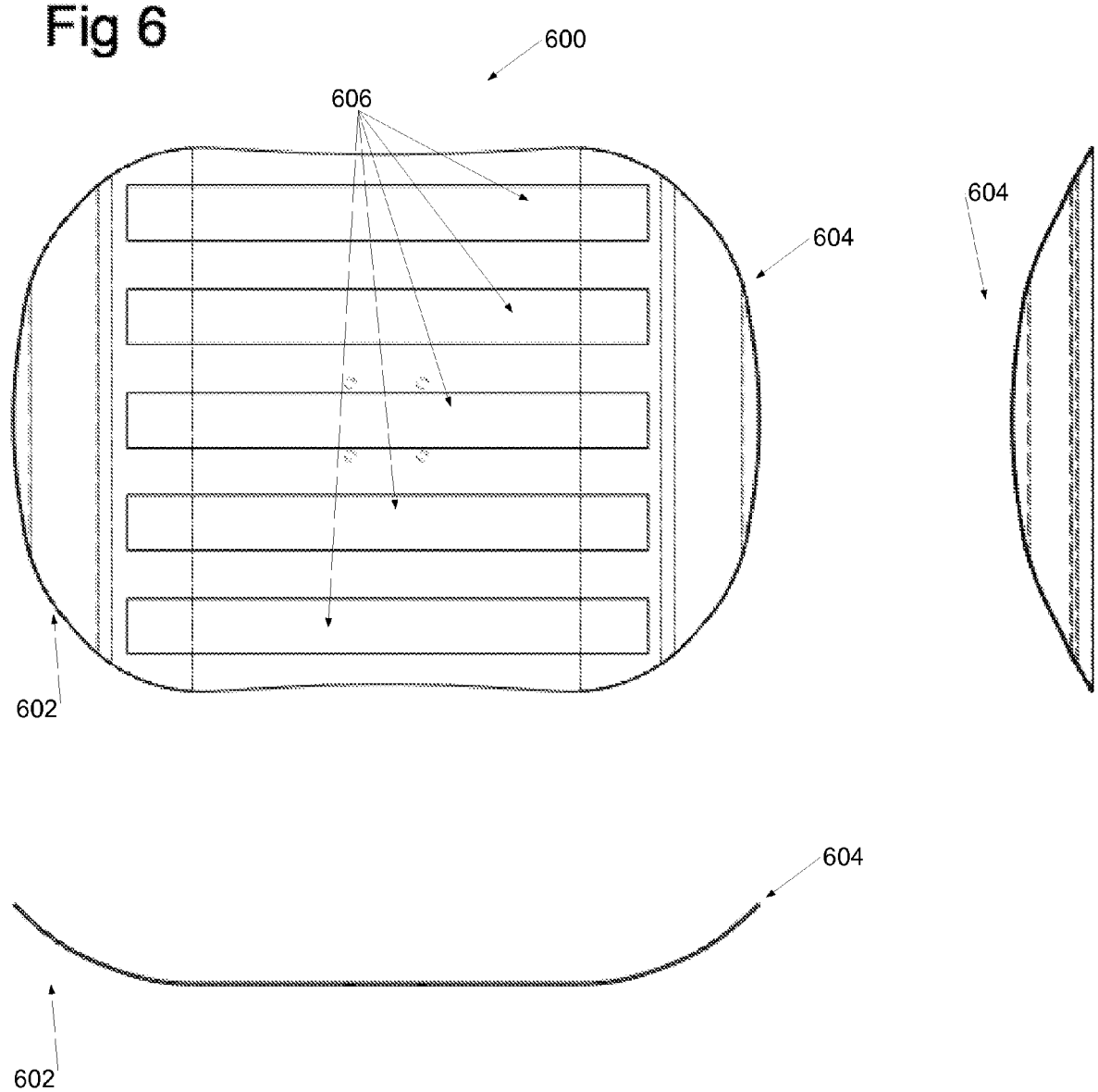

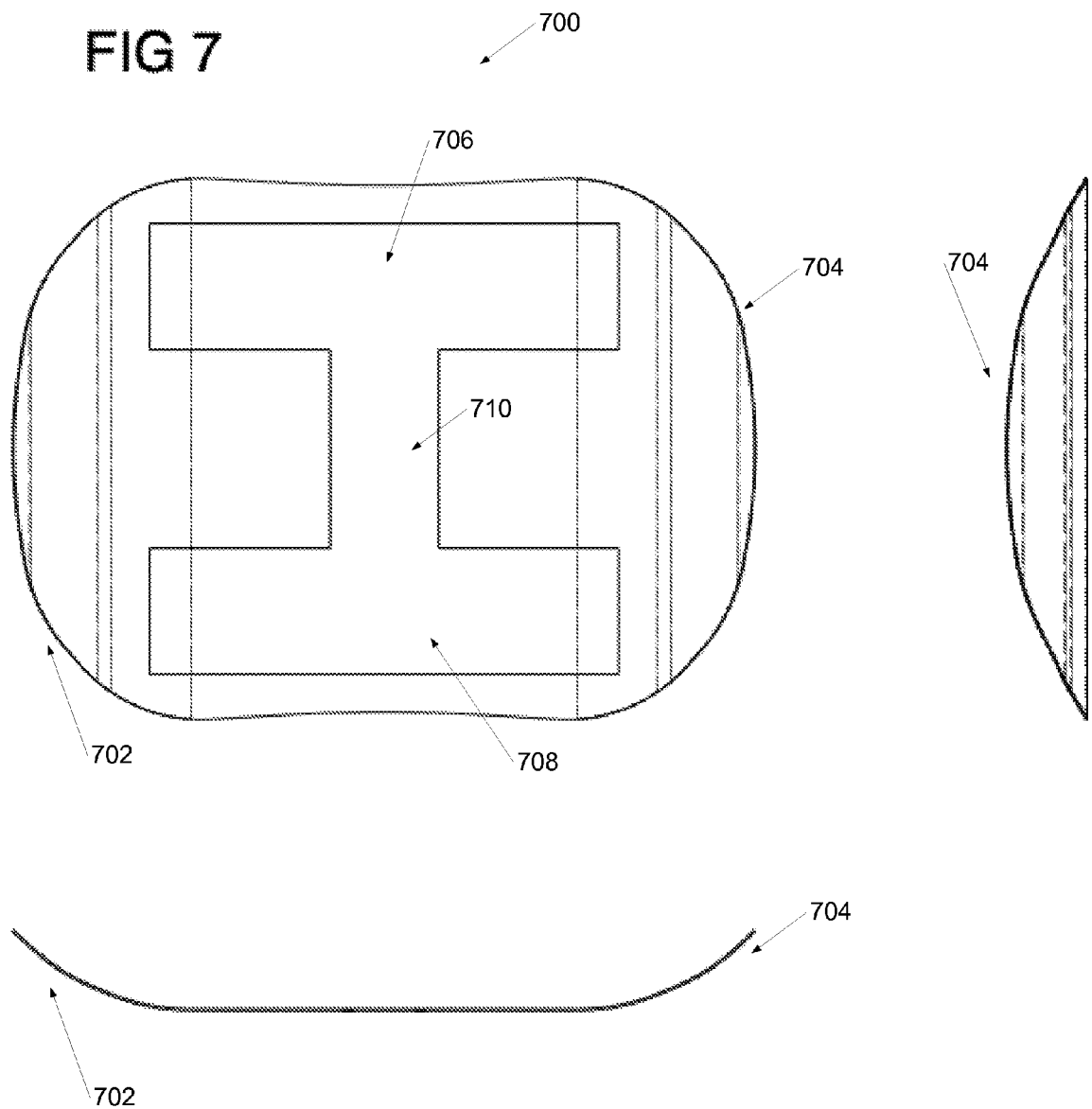

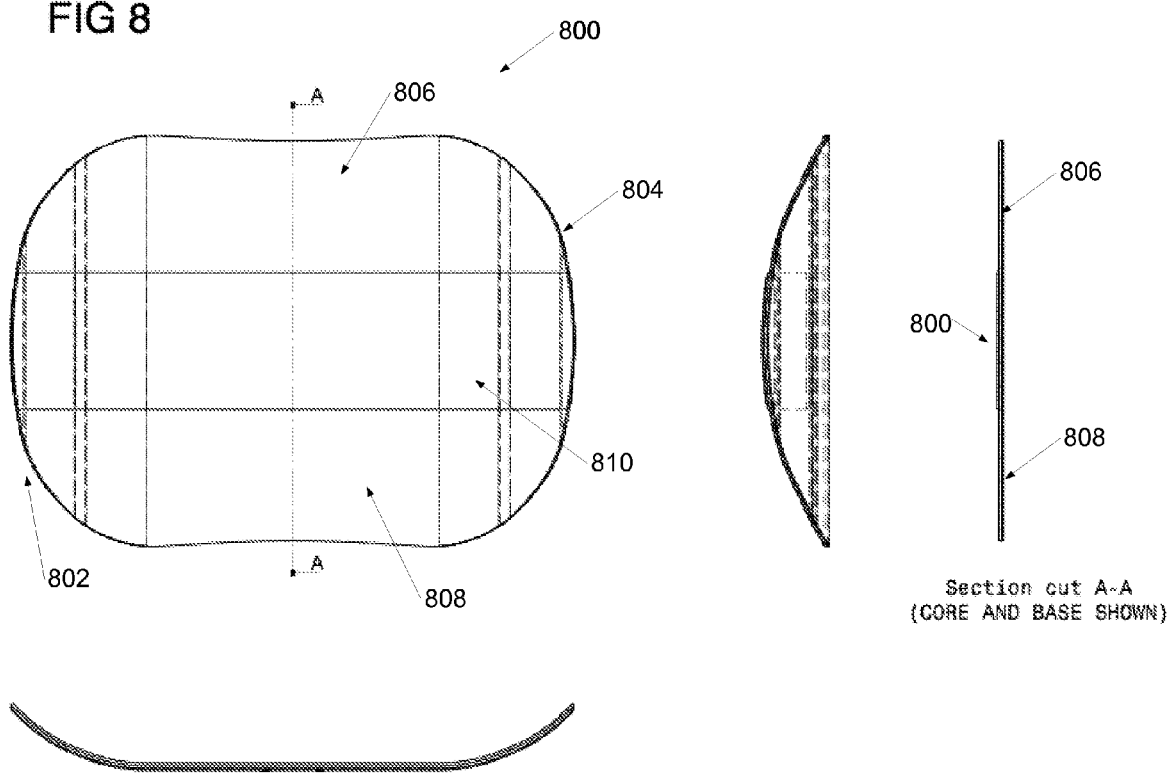

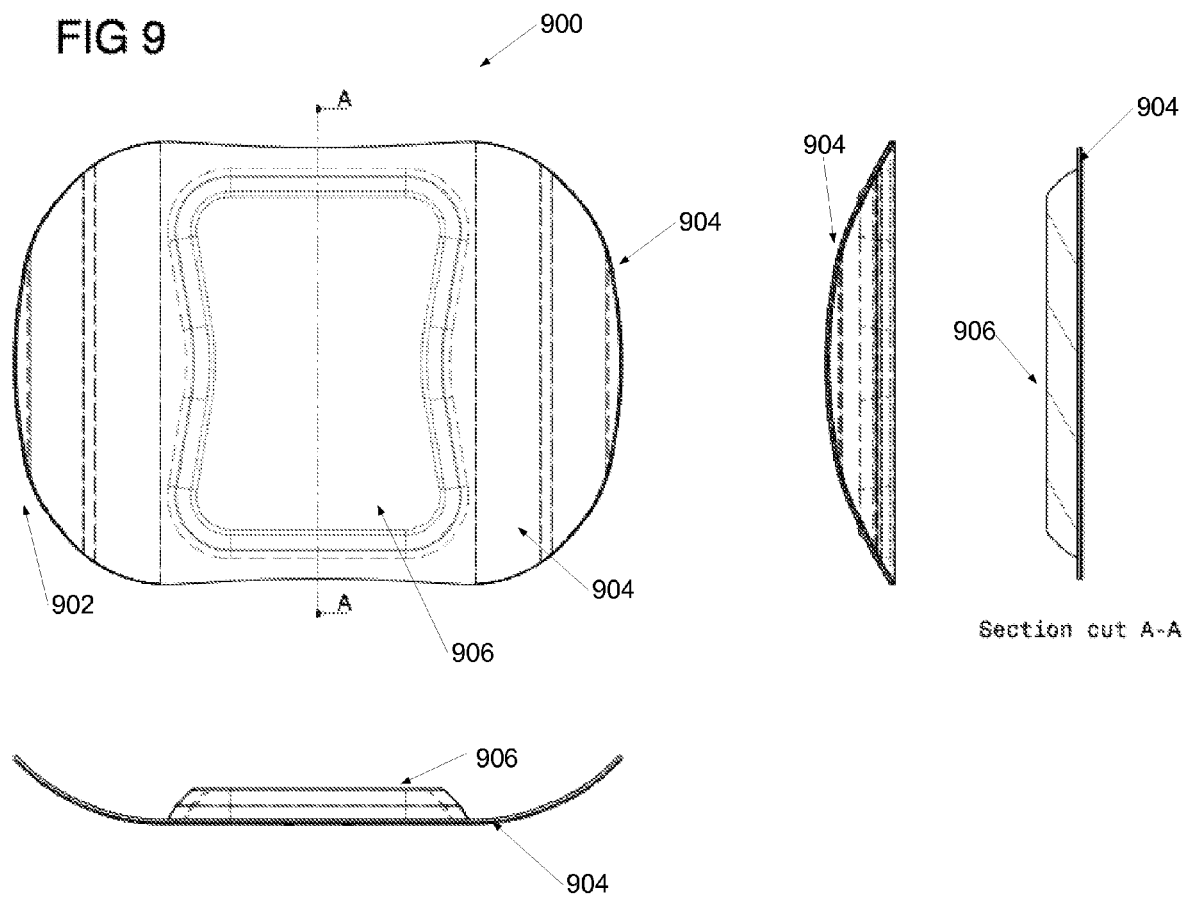

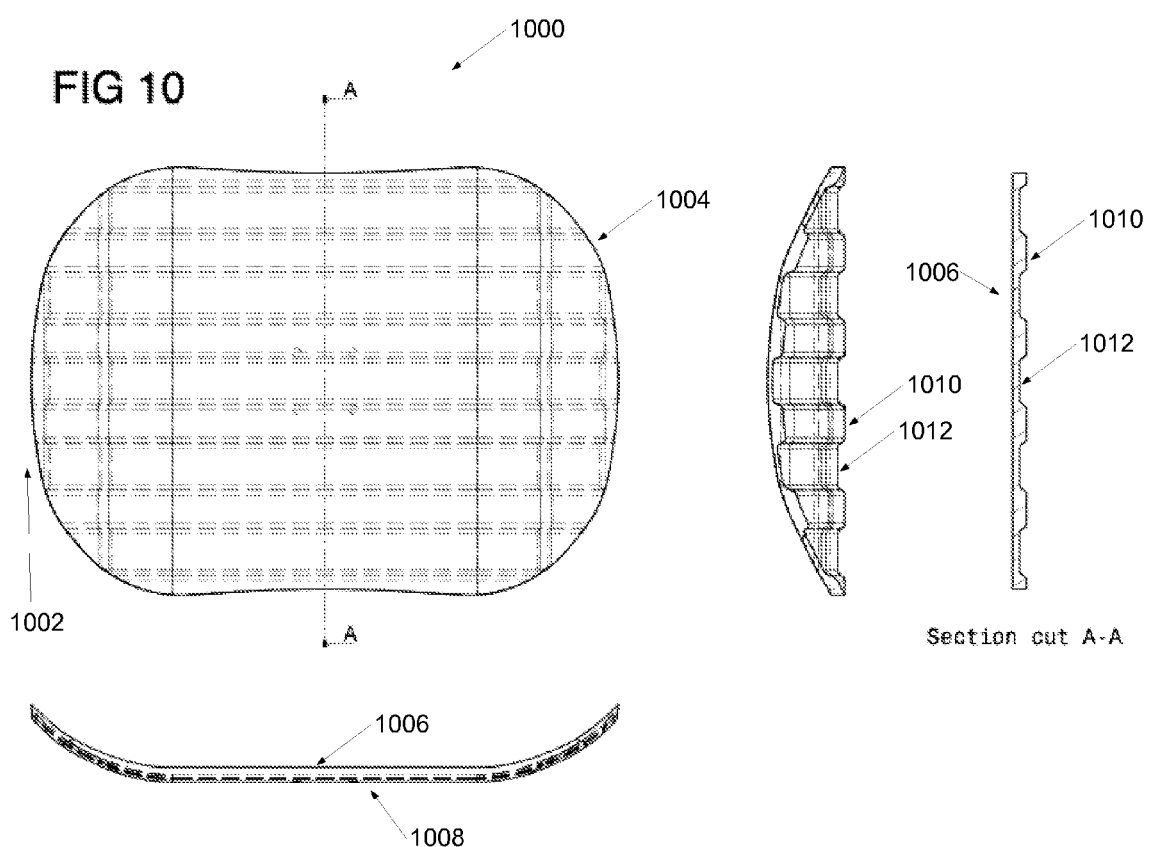

SYSTEM FOR GLIDING ON SNOW WITH IMPROVED MOBILITY

RELATED APPLICATIONS

This application claims priority to U.S. Provisional Application Ser. No. 61/672,310 entitled "SYSTEM FOR GLIDING ON SNOW WITH IMPROVED MOBILITY" filed on Jul. 17, 2012 which is herein incorporated by reference.

FIELD

The present inventive subject matter relates to the field of snow sports and more particularly to two-piece snowboarding technology.

BACKGROUND

Boards and similar devices for gliding on surfaces are well known. Snowboards, skis, snowblades, breakboards, wakeboards, surfboards and the like are examples of gliding boards. For purposes of this disclosure, "gliding board" or "gliding boards" refers generally to any of the foregoing boards as well as to other devices which allow a rider to traverse a surface. For ease of understanding, however, and without limiting the scope of the invention, aspects of the invention are discussed below particularly in connection with a snow gliding technology where the gliding device is connected to the rider at the rider's feet.

Skis generally attach to the rider's feet via rigid boots and a releasable binding. The gliding surface is generally long and narrow and the rider glides on the skis in a forward facing manner—with toes pointing in the direction of travel.

Snowblades or skiboards are similar to skis, only they are generally shorter and wider. Like skis, snowblades are used by the rider in a forward facing manner.

Snowboards provide a single gliding surface and generally attach to the rider's feet via a softer boot. As opposed to the rider orientation when wearing skis, the rider of a snowboard will glide on a snowboard in a sideways facing manner—with toes pointing at a substantial angle to the direction of travel (generally around 90 degrees).

Breakboards or breakboard snowboards are similar to snowboards in that the rider will generally glide in a sideways facing manner. Breakboards allow the rider additional freedom and flexibility over a snowboard because they provide separate gliding boards for each foot. Known breakboards have limitations in their shape, composition and symmetry, however.

BRIEF DESCRIPTION OF THE DRAWINGS

Embodiments of inventive subject matter may be best understood by referring to the following description and accompanying drawings, which illustrate such embodiments. In the drawings:

FIG. 2 includes multiple views of an example gliding board incorporating the inventive subject matter.

FIG. 3 includes multiple views of example gliding boards incorporating the inventive subject matter.

FIG. 4 includes multiple views of an example gliding board incorporating the inventive subject matter.

FIG. 5 includes multiple views of an example gliding board incorporating the inventive subject matter.

FIG. 6 includes multiple views of an example gliding board incorporating the inventive subject matter.

FIG. 7 includes multiple views of an example gliding board incorporating the inventive subject matter.

FIG. 8 includes multiple views of an example gliding board incorporating the inventive subject matter.

FIG. 9 includes multiple views of an example gliding board incorporating the inventive subject matter.

FIG. 10 includes multiple views of an example gliding board incorporating the inventive subject matter.

DETAILED DESCRIPTION

In the following description, reference is made to the accompanying drawings that form a part hereof, and in which is shown by way of illustration, specific embodiments which may be practiced. These embodiments are described in sufficient detail to enable those skilled in the art to practice the invention, and it is to be understood that other embodiments may be utilized and that structural, logical and mechanical changes may be made without departing from the scope of the present invention. The following description of example embodiments is, therefore, not to be taken in a limited sense, and the scope of the present invention is defined by the appended claims.

Figure 1:
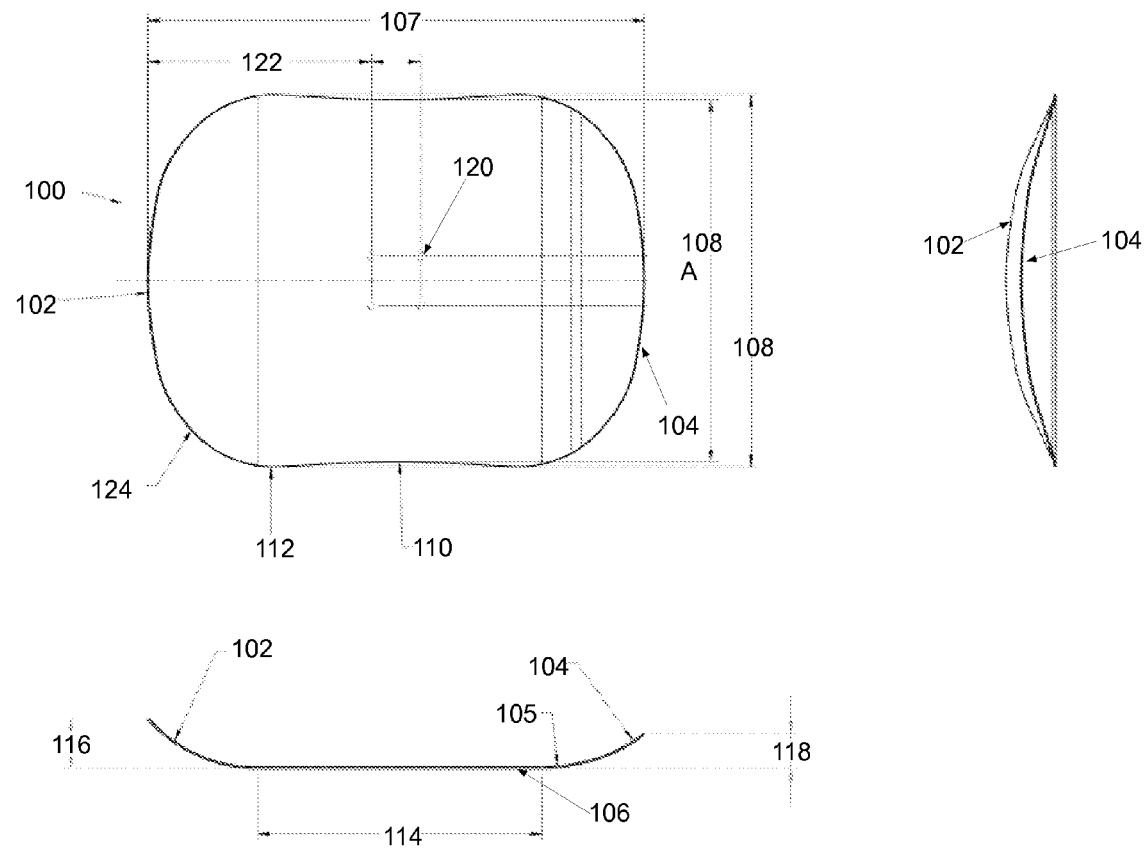
FIG. 1 includes multiple views of an example gliding board incorporating the inventive subject matter.

FIG. 1 shows a breakboard snowboard 100 having a nose 102, a tail 104, a top 105, a base 106 a running length 107, a hip width 108, a waist width 108A, a sidecut 110, a side 112, a primary gliding surface 114, a nose shovel 116, a tail shovel 118, binding mounting 120, and an edge 124.

The breakboard snowboard (or "board") 100 includes a running length 107 extending between the nose 102 and tail 104. The nose 102 and tail 104 may have a "shovel" shape where the breakboard snowboard 100 end curves upwardly away from the gliding surface 114, generally avoiding contact with the snow when riding on smooth terrain.

The nose 102 and/or tail 104 provide an important function when gliding over uneven, curved or bumpy surfaces, as well as when riding in deep snow or powder. When gliding on such surfaces, the nose 102 and/or tail 104 can prevent an end from digging into or catching on a curve or bump, and instead allow the breakboard snowboard 100 to glide up a curve or over a bump. When riding in deep snow, the leading end of the breakboard snowboard 100 (which could be the nose 102 or tail 104) is upturned and contacts the snow so that the board 100 does not dive under the snow surface. Put another way, the upturned nose 102 or tail 104 forces snow under the board 100 onto the gliding surface 114 and keeps the board 100 from sinking excessively into the snow.

According to one embodiment of the inventive subject matter, the board 100 is provided with a nose 102 and a tail 104 which have a respective nose shovel 116 and tail shovel 118 generally defined by the rise of the nose 102 or tail 104 above the gliding surface 114 (or more specifically, the end of the gliding surface 114 nearest the nose 102 or tail 104). One of the nose shovel 116 and the tail shovel 118 is of greater height than the other. According to one embodiment of the inventive subject matter, the nose 102 is provided with a nose shovel 116 which has a greater rise above the gliding surface 114 than the rise of the tail shovel 118 above the gliding surface 114.

Figure 1A:
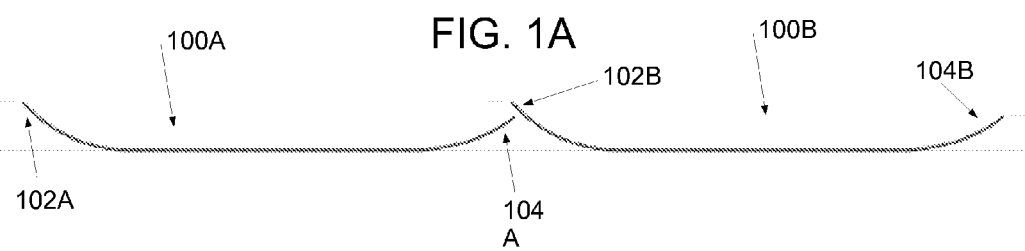
FIG. 1A includes a side-view of two gliding boards in an example riding orientation according to embodiments of the inventive subject matter.

The benefits of having nose 102 (102A,102B in FIG. 1A) and the tail 104 (104A, 104B in FIG. 1A) with differing nose shovel 116 and tail shovel 118 is described with respect to FIG. 1A. FIG. 1A includes two boards 100A and 100B. These boards are generally used as such, in pairs, with one board for each foot of the rider, in a configuration with the tail 104A of the front board 100A facing the nose 102B of the rear board 100B. By designing the boards 100A, 100B with a larger nose shovel than tail shovel, a benefit is provided wherein the rear board 100B is able to travel closer to the front board 100A before contacting. Because the end of the nose 102B of the rear board 100B is elevated above the end of the tail 104A of the front board 100A, as the rear board 100B approaches the front board 100A it is able to overlap rather than crashing edges together. Additionally, when the boards 100A, 100B overlap as such, any succeeding collision between the boards 100A, 100B would be between the base of nose 102B the rear board 100B and the edge of the tail 104A of the front board 100A. This type of collision will generally result in a sliding action, allowing the rear board 100B to ride up onto the top of the edge of the tail 104A of the front board 100A. This type of interaction between the boards 100A, 100B is less likely to cause damage to the boards 100A, 100B or otherwise affect the rider in a way that would impact his or her riding experience. Boards with equal height nose and tail shovels are more likely to collide edge-to-edge. These types of boards are generally configured with a circumferential metal edge. A collision between boards of equal nose and tail shovel heights would likely cause a metal-to-metal impact which has the potential to do damage to the board, and also disrupt movement one or both of the boards in a way detrimental to the riding experience.

It can be advantageous for a rider to be able to bring the front board 100A and the rear board 100B close to each other because the rider's stance is based on the separation between the boards 100A, 100B. While riding, a rider may want to be able to adjust stance on the fly in order to adapt to changing terrain. Additionally, outside of the rider's control, the terrain may cause a rider to change stance and it is advantageous for the boards to be configured in such a way to be able to smoothly adapt to such circumstances without a hard collision (such as a metal-to-metal impact).

FIG. 2 shows a board 200 which may be a breakboard snowboard having a minor axis 202 and a major axis 204, a side edge 206, a primary base 208 and a concave base 210.

According to embodiments of the inventive subject matter, the board 200 has a lateral concavity in its base shape along the major axis 204 such that any line along the surface of the base of the board 200 which is substantially parallel with the major axis 204 will be substantially straight. Any line along the surface of the base of the board 200 which is substantially parallel with the minor axis 202 will have a curvature.

When set on a substantially flat surface, the concave base 210 will rise up above the surface plane away from the primary base 208 which will contact the surface. Assuming symmetry about the major axis 204, the concave base 210 will rise from the primary base 208 to a certain height and return to the primary base 208 on the opposite of the major axis 204. This symmetry is not essential to the inventive subject matter—the invention will be operable where the concave base 210 curvature is not the same on either side of the major axis 204. Additionally, according to other embodiments of the inventive subject matter, the rise and fall of the concavity of the concave base 210 may vary along the major axis 204. For example, the concavity near the tip and/or tail of the board 200 may be less dramatic than the concavity near the center of the board where the major axis 204 intersects the minor axis 202. According to other examples, the concavity near the tip and/or tail of the board 200 may be more dramatic than the concavity near the center of the board where the major axis 204 intersects the minor axis 202.

One of the purposes of such base concavity along the major axis 204 is to allow the board to better "grab" onto a terrain park element such as a rail or box edge. The concavity allows the board to better ride on such an element along its center line (the major axis 204)—the curvature helps force the board to slide in such a manner. Riding along the center line (major axis 204) helps the rider better balance himself or herself on the board(s). Another purpose of the of the base convacity is to provide some cushion and/or "snap" to the board so that some energy can be absorbed by the board as it flattens when a rider lands after riding off a jump or other terrain element. Other purposes are considered.

According to another aspect of the inventive subject matter, the side edge 206 of the board 200 may be elevated, sloped up from or curved upwards from the primary base 208. This vertical deviation in the side edge 202 from the plane of the primary base 208 helps allow the edge of the board 200 to ride above the gliding surface. Since the edge of a gliding board may be sharp (in a snowboard or breakboard snowboard for example), it may be beneficial to have the side edge 206 raised to avoid catching the edge on the gliding surface.

According to various embodiments, the board 200 may be a traditional snowboard or other gliding board.

FIG. 3 shows a board 300 having a first end 306, a second end 308, an oblique portion 302, and an acute portion 304. The first end 306 (or, alternatively, the second end 308) may simply have a traditional curved shape according to some embodiments. According to this example embodiment of the inventive subject matter, at least one of the first end 306 and the second end 308 will have a substantially parallelogram-like shape with an oblique portion 302 and an acute portion 304. The oblique portion 302 may generally be defined by the substantially oblique angle created by the intersection of a side edge and board end (tip or tail). Similarly, the acute portion 304 may be defined by the substantially acute angle created by the intersection of the other side edge and board end (tim or tail).

Two boards 300 may be used in conjunction as typical for breakboard snowboards with one board attached to each foot of the rider. A first board 300A and a second board 300B may used in a configuration where the oblique portion 302 of the first board 300A is near the acute portion 304 of the second board 300B and the acute portion 304 of the first board 300A is near the oblique portion 302 of the second board 300B. This configuration allows the rider additional stance options, such as a reduction in the lateral distance between feet (as measured along a board major axis or similar parallel line). The rider may simply move the second board 300B forward and toward the first board 300A. The parallellogram-like shape of the adjacent edges of the board allows this movement to take place without the boards 300A, 300B intersecting each other.

FIG. 4 shows a board 400 having a nose 402 and a tail 404, a concave portion 406 and one or more convex portions 408A, 408B.

According to an embodiment of the inventive subject matter, the board 400 will have a shape (when viewed along a major axis cross-section) which is somewhat undulating. The undulating characteristic may be defined by a convex portion 408A extending from the nose 402 and curving into a concave portion 406 which curves into a further convex portion 408B which extends from the tail 404. According to other embodiments of the invention, only one convex portion 408A, 408B may be present, allowing the concave portion 406 to extend into the nose 402 or alternatively into the tail 404.

According to yet another embodiment of the invention, the undulating characteristic may only exist in the base of the board, while the top surface remains substantially planar (not including the nose 402 and tail 404).

The concave portion 406, according to some embodiments, may be approximately the width of a typical snowboard binding, when measured along the major axis of the board 400. a portion of the concave portion may have a substantially planar shape (rather than being continuously curved) in order to provide a flat mounting surface for a binding. According to another embodiment, the shape of the convex portions 408A, 408B or the concave portion 406 may be defined by a substantially curved surface, or alternatively by flat an angled surfaces.

FIG. 5 shows a board 500 having a nose 502 and a tail 504 and side edges 506 extending along the perimeter of the board 500 between the nose 502 and tail 504. According to an embodiment of the inventive subject matter, the side edges 506 may define other than straight lines. The side edges 506 may be characterized by an undulating shape whereby the side edges 506 of the board 500 make concave and convex shapes when viewed top-down as shown.

Side edges 506 allow for better grip on icy and hard packed snow conditions, giving the board 500 a serrated cutting edge 506 that can "bite" into the terrain. In addition the concave and convex shapes increase the overall length of the side edges 506, improving the traction of the board while carving.

FIG. 6 shows a board 600 having a nose 602 and a tail 604 and core material 606. According to various embodiments of the inventive subject matter, the core material 606 may be comprised of several individual strips. The core material 606 may be all individual and separate strips of material with no connection between each section, or alternatively, there may be connecting points in order to adjust flexibility or make manufacturing simpler. One advantage of a core composition of this sort is that the spaces or discontinuity between the pieces of core material 606 allow the board 600 to flex more easily in the direction perpendicular to the long axis of the core material 606 segments. For example, where the core material 606 segments generally run from nose 602 to tail 604, the board 600 is more apt to flex from side edge to side edge (along the minor axis of the board 600). In another embodiment, the core material 606 segments may generally run perpendicular to the major axis of the board 600 (e.g. from side edge to side edge between the nose 602 and tail 604). This arrangement will generally allow for increased flexibility along the major axis of the board between the nose 602 and tail 604. Combinations of these described embodiments, splitting the core material 606 in various directions in order to achieve desired flex along any axis of the board are considered and are part of the inventive subject matter. The core material 606 need not be full length strips of material, but rather may be sections of material patterned withing the board with separations or gaps placed to provide additional flexibility.

According to yet another aspect of the inventive subject matter, the core material 606 need not be fully separated between segments, rather, variations in thickness (or stacking of core material) may be used to adjust flexibility in a similar fashion that one would use separations in the core material 606.

FIG. 7 shows a board 700 having a nose 702 and tail 704, and core sections 706, 708, 710. Similar to the embodiments of FIG. 6, the board 700 includes segmented/shaped core material in order to adjust or improve flexibility. According to this embodiment of the inventive subject matter, multiple core sections are provided, a first major axis segment 706 and a second major axis segment 708 are positioned within the board 700 running generally from nose 702 to tail 704. A minor axis segment 710 is provided, running generally from side-edge to side-edge (along a minor axis) connecting the first major axis segment 706 and the second major axis segment 708. Additional major axis segments and minor axis segments may be added to adjust flex characteristics of the board 700.

FIG. 8 shows a board 800 having a nose 802 and a tail 804. According to various embodiments of the inventive subject matter, the board 800 is provided with varying core thicknesses. A first lateral core segment 806 is provided, running from nose 802 to tail 804 generally adjacent a one side-edge. A second lateral core segment 808 is provided, running from nose 802 to tail 804 generally adjacent to the other side-edge. A center core segment 810 is provided running from nose 802 to tail 804 generally between the first and second lateral core segments 806, 808. According to various embodiments, the center core segment 810 may be provided with a thickness different from the first lateral core segment 806 and the second lateral core segment 808. In some embodiments, the center core segment 810 is thicker and in others it is thinner than the lateral core segments 806, 808.

According to various other embodiments, the described core segments 806, 808, 810 may be provided running generally perpendicular to the major axis of the board 700. In such an embodiment, a first core segment may be adjacent to the nose 802, a second core segment may be adjacent to the tail 804 and a third core segment may be positioned between the first and second core segments.

FIG. 9 shows a board 900 having a nose 902 and a tail 904. According to various embodiments of the inventive subject matter, the board 900 includes an ordinary board section 904 and a riser section 906. Both the ordinary board section 904 and the riser section 906 may be disposed upon a common base material and common layer of fiber/resin. The ordinary board section 904 and the riser section 906 may share a first core layer, and the riser section 906 may comprise an additional or thicker core layer allowing it to rise above the ordinary board section 904. In this embodiment, one or more layers may substantially continuously cover the ordinary board section 904 and the riser section 906. The additional layers may include fiber, resin, topcoat, lacquer coat, or other layers. According to other embodiments the riser section 906 may be a separate layer or series of layers set on/above the ordinary board section 904. The riser section 906 may provide a relatively flat surface for mounting a binding, or the surface may have a contour or wedge shape in any particular direction.

Riser section 906 raises the binding and boot from the base of the board, reducing the chance of heel and toe drag when carving.

FIG. 10 shows a board 1000 having a nose 1002 a tail 1004, a top surface 1006 and a base surface 1008. According to various embodiments of the inventive subject matter, the base surface 1008 may be comprised of an uneven surface. The vase surface 1008 may include a series of elevated surfaces 1010 and valley surfaces 1012 which may alternate from side edge to side edge. The elevated surfaces 1010 and the valley surfaces 1012 may be arranged generally in parallel with the major axis of the board 1000, stretching from the nose 1002 to the tail 1004. The transition between elevated surfaces 1010 and valley surfaces 1012 may be abrupt or gradual. The number of elevated surfaces 1010 and valley surfaces 1012 may be as few as one each to as many as possible to fit on the board given manufacturing constraints. Additionally, the number of elevated surfaces 1010 need not be equal to the number of valley surfaces 1012, nor do the width of the elevated surfaces 1010 need to be equal or similar to the width of the valley surfaces 1012. The elevated surfaces 1010 may have a differing surface shape (concave, convex, pointed, flat and so on) than the valley surface 1012.

The addition of these elevated surfaces 1010 and valley surfaces 1012 give the board greater directional control with little effort by the operator. This also aids in stiffening the board 1000 down the length of the board.

Figure 11:
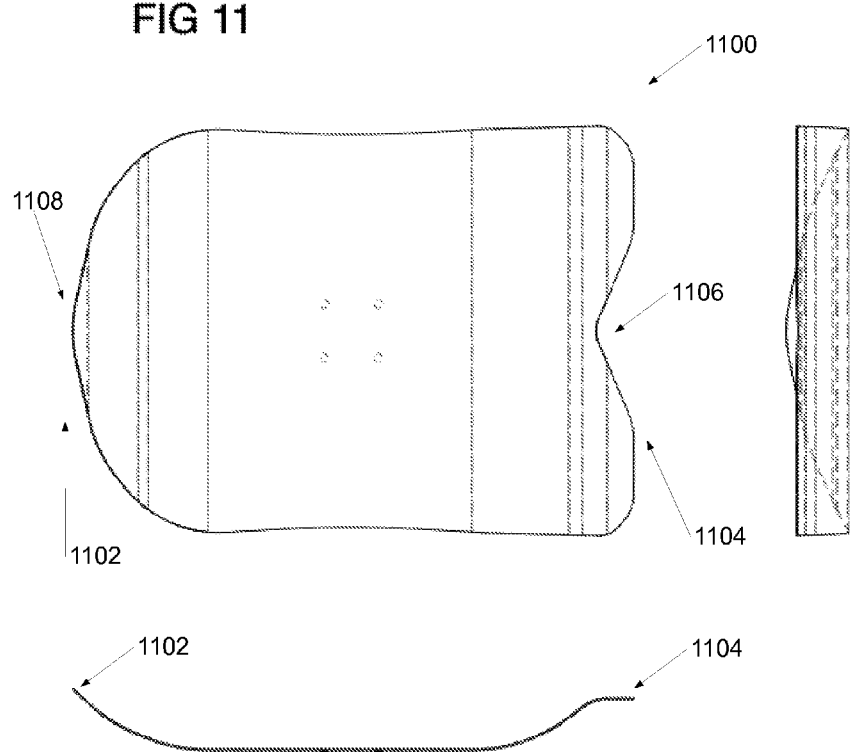
FIG. 11 includes multiple views of example gliding boards incorporating the inventive subject matter.
Figure 11A:
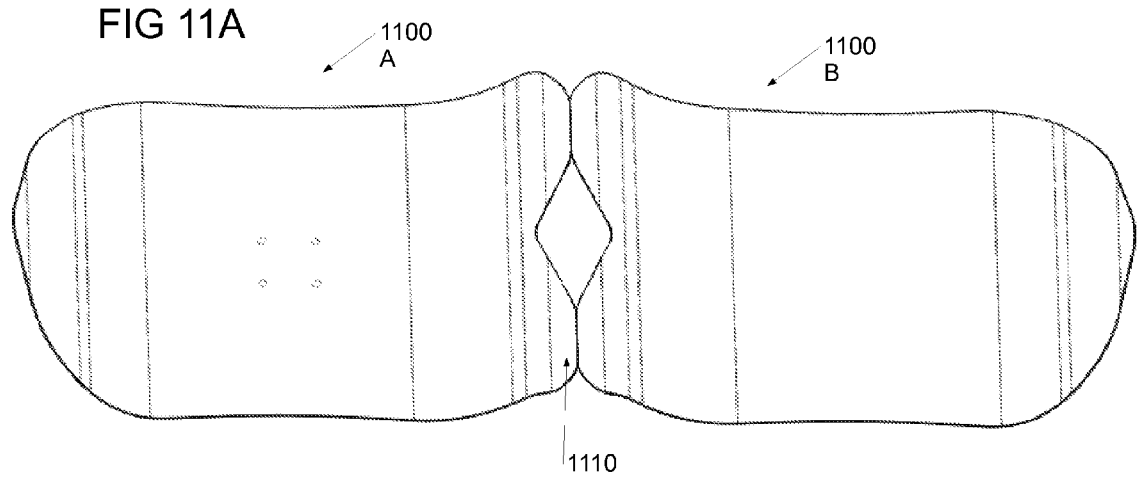
FIG. 11A includes a top perspective view of two gliding boards in an example riding orientation according to embodiments of the inventive subject matter.

FIG. 11 shows a board 1100 having a nose 1102 and tail 1104, a nose tip 1108 and a tail depression 1106. According to various embodiments of the inventive subject matter, when two boards 1100 are used in conjunction with the rider feet facing approximately perpendicular to the direction of gliding (i.e. the direction generally along the line created by the tail 1104 and nose 1102), the nose 1102 of a rear board may be able to cross the plane of the tail 1104 of the front board. This action happens when the nose tip 1108 of the rear board is able to maneuver into the tail depression 1106 of the front board. The tail depression 1106 may be shaped in a way to engage with the nose tip 1108. This construction and orientation allows for the two boards, when used together to move closer together, allowing the rider to have more versatility in their stance.

According to other embodiments of the inventive subject matter, the tail 1104 of the board 1100 may have a shovel which rises and flattens (or creates a suitable engagement surface). A first board 1100A and a second board 1100B may be brought together tail-to-tail and an engagement mechanism 1110 may be used to connect the boards 1100A, 1100B. The connection between the boards 1100A, 1100B may be semi-permanent, temporary or momentary according to various embodiments. The rider may utilize the engagement mechanism 1110 when ready to glide, and disengage when finished or walking (or on a lift for example). According to another alternative, the rider may utilize (engage or disengage) the engagement mechanism on the fly while riding. The engagement mechanism may comprise a mechanical latch, one or more magnets, or other mechanism to secure two boards to each other. According to various other embodiments, the engagement mechanism 1110 may not be an integral part of the first board 1100A or the second board 1100B, but may rather be an additional element added to the boards. It should be noted that the nose tip 1108 and/or the tail depression 1106 are not necessary for the implementation of the embodiments whereby the boards 1100A, 1100B are connected via an engagement mechanism 1110.

The boards described herein may be constructed in a number of ways, Typical construction types are described below, although others are considered as well.

A cap-type snowboard is typically constructed from several components including a core, e.g., made of wood, top and bottom reinforcing layers that sandwich the core, a top cosmetic layer and a bottom gliding surface, or base. The top reinforcing layer typically overlaps the side edges of the core to protect the core from the environment and provide structural support to the board. Since the core in a cap-type board typically extends into the nose and tail ends of the snowboard, tapering the core at the nose end results in a board having a tapered nose and improved float.

Another construction type of snowboard is the sidewall-type board (also known as sandwich construction). Similar to a cap board, sidewall boards typically have a core, top and bottom reinforcing layers, a top cosmetic layer and a bottom gliding surface. However, in contrast to cap boards, the top reinforcing layer does not cover the side edges of the core. Instead, a sidewall support member is positioned between the top and bottom reinforcing layers (and/or a metal edge at the bottom of the board). The sidewall is bonded to the top and bottom layers to protect the interior of the board, including the core, from the environment. The core in sidewall boards does not normally extend into the nose and tail ends of the board. Instead, the core terminates near the transitions at the nose and tail, and a spacer made from a flat sheet material is positioned between the top and bottom reinforcing layers in the nose and tail. The spacer typically has a constant thickness and forms a significant portion of the thickness of the nose and tail ends. Thus, prior sidewall-type boards have not been provided with a tapered nose or other features to improve the float of the board.

To improve on the ability of a board to force a proper amount of snow under the board and keep the rider at a suitable position relative to the surface of snow, a board may have a core that has a tapered or substantially reduced thickness at the nose (or tail). This tapered thickness increases in flexibility from the transition or contact area toward the tip of the nose. This increased flexibility allows the nose to flex upward to a varying degree along the nose when contacted by snow, thereby increasing the frontal area on the nose and the amount of lift provided to the board.

According to other embodiments, the core material may be provided with a similar material as used on the base of a board. This will result in a board that has increased flexibility due to the absence of a rigid core material. Other semi-rigid or flexibile core materials may be considered as well with varying thickness/taper to increase or decrease flexibility in different areas or directions on the board.

The inventive subject matter describes a device gliding on a surface, the device providing improved mobility for the rider. For example, by providing separate boards to be attached to each foot of a rider for riding sideways (approximately perpendicular to the facing of the rider's feet), and the boards having tips and tails of differing heights, the riding experience can be substantially improved. In this example, the inventive subject matter allows the rider to have improved mobility by allowing the front and rear board to slide closer to each other and also decrease the effects of a collision between the boards.

Embodiments of the system for gliding on a surface with improved mobility are disclosed. One skilled in the art will appreciate that the present teachings can be practiced with embodiments other than just those disclosed. The disclosed embodiments are presented for purposes of illustration and not limitation. Various components are presented for the purpose of describing example embodiments. Just because a component is described with respect to an example embodiment does not require that it is a necessary component with respect to the inventive subject matter.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:
1. A snow gliding system comprising:
 a first board having a first major axis, and a first minor axis, the first board comprising:
  a first base including a first gliding surface;
  a first top surface opposite the first base;

a first nose including an upturned portion of the first top surface and the first base;

a first tail opposite the first nose along the first major axis, the first tail including an upturned portion of the first top surface and the first base, the first tail rising above the first gliding surface to a first shovel height; and a second board having a second major axis, and a second minor axis, the second board comprising:

a second base including a second gliding surface;

a second top surface opposite the second base;

a second nose including an upturned portion of the second top surface and the second base, the second nose rising above the second gliding surface to a second shovel height, the second shovel height being greater than the first shovel height;

a second tail opposite the second nose along the second major axis, the second tail including an upturned portion of the second top surface and the second base;

wherein the first tail is configured to be positioned beneath the second nose when the first gliding surface and the second gliding surface are coplanar.

2. The snow gliding system of claim 1, wherein the first tail is shaped such that contact with the second nose causes the second nose to slide upon the first tail.

3. The snow gliding system of claim 1, wherein the first major axis and the second major axis define the direction of travel and the first minor axis and the second minor axis define a rider foot placement.

4. The snow gliding system of claim 1, further comprising first binding mounting hardware exposed through a central area of the first top surface and second binding mounting exposed through a central area of the second top surface.

5. A sliding system for riding sideways on snow, the system comprising:

a front board having an upturned front board nose and a front board tail; and a rear board having an upturned rear board nose and a rear board tail, the rear board configured to be positioned adjacent the front board with the rear board nose closest to the front board tail, the rear board nose configured to overlap the front board tail without contacting the front board tail.

6. The sliding system for riding sideways on snow of claim 5, wherein the front board includes a front board gliding surface between the front board nose and the front board tail, and the rear board includes a rear board gliding surface between the rear board nose and the rear board tail, the front board tail further includes an upturned end rising above the front board gliding surface to a lower height than the rear board nose rises above the rear board gliding surface.

7. The sliding system for riding sideways on snow of claim 6, wherein the front board nose rises above the front board gliding surface to a greater height than the rear board tail rises above the rear board gliding surface.

8. A breakboard system comprising:

a first board having a first running length, a first top surface and a first base opposite the first top surface, the first board being shaped with first sidecuts defining a first front hip and a first rear hip at the widest points perpendicular to the first running length, and a first waist located centrally between the first front hip and the first rear hip, the first board including a first nose defined by the portion of the board forward of the first front hip, a first tail defined by the portion of the board to the rear of the first rear hip, and a first gliding surface on the first base, the first nose including a first nose shovel height above the first gliding surface, and the first tail including a first tail shovel height above the first gliding surface; and a second board having a second running length, a second top surface and a second base opposite the second top surface, the second board being shaped with second sidecuts defining a second front hip and a second rear hip at the widest points perpendicular to the second running length, and a second waist located centrally between the second front hip and the second rear hip, the second board including a second nose defined by the portion of the board forward of the second front hip, a second tail defined by the portion of the board to the rear of the second rear hip, and a second gliding surface on the second base, the second nose including a second nose shovel height above the second gliding surface, and the second tail including a second tail shovel height above the second gliding surface;

wherein the second nose shovel height is greater than the first tail shovel height;

wherein the second board is configured to be positioned adjacent the first board with the second nose nearest the first tail;

wherein the first board and the second board are configured such that with the first gliding surface and second gliding surface in the same plane, a portion of the second nose is able to overlap a portion of the first tail.

9. The breakboard system of claim 8, wherein the first board and the second board are positioned with a portion of the second nose overlapping a portion of the first tail.

10. The breakboard system of claim 8, wherein the first tail includes an edge; and wherein when the first gliding surface and second gliding surface are in substantially the same plane, contact between the first tail and the second nose causes the second base to slide on the edge of the first tail.

* * * * *